(No Model.)
M. S. LEWIN.
LINEN RUBBER.
No. 574,099.  Patented Dec. 29, 1896.
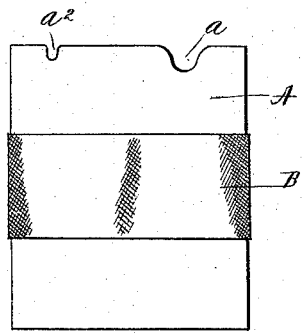
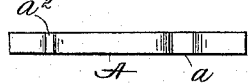
WITNESSES:
John Buckler,
C. Girst
INVENTOR
Maurice S. Lewin,
BY Edgar Tate & Co
ATTORNEYS

UNITED STATES PATENT OFFICE.

MAURICE SOLOMON LEWIN, OF PHILADELPHIA, PENNSYLVANIA.

LINEN-RUBBER.

SPECIFICATION forming part of Letters Patent No. 574,099, dated December 29, 1896.

Application filed January 16, 1896. Serial No. 575,807. (No model.)

*To all whom it may concern:*

Be it known that I, MAURICE SOLOMON LEWIN, a citizen of the United States, and a resident of Philadelphia, in the county of Philadelphia and State of Pennsylvania, have invented certain new and useful Improvements in Linen-Rubbers, of which the following is a specification, reference being had to the accompanying drawings, forming a part thereof, in which similar letters of reference indicate corresponding parts.

The object of this invention is to provide an article for rubbing linen articles of apparel, such as collars, cuffs, the neckbands of shirts, and other and similar articles of apparel or parts thereof, a further object being to provide a device of this class which is especially adapted for use where such articles have been starched in order to remove the rough splints, threads, projections, &c., and thus obviate the unpleasant and disagreeable sensation caused by the contact thereof with the skin.

The invention is fully disclosed in the following specification, of which the accompanying drawings form a part, in which—

Figure 1 is a side view of my improved linen-rubber; Fig. 2, an end view thereof with the band removed, and Fig. 3 an edge view.

In the practice of my invention I provide a linen-rubber A, which is oblong and rectangular in cross-section, and said rubber may be composed of light-colored wood, stiff white felt, heavy white cardboard, or any stiff material which will turn over and smooth down the splints, stiff threads, and other projecting points at the edges of collars and cuffs, the neckbands of shirts, and similar articles by being rubbed thereon and which will at the same time not injure the article to which it is applied.

The rubber A is preferably provided with a central band B, of leather or similar material, or this band B may also be composed of wood, if desired, and said rubber is provided along one end thereof with U-shaped notches or recesses $a$ and $a^2$, into which the edges of collars, cuffs, the neckbands of shirts, or other articles may be inserted in the process of rubbing hereinbefore described, and, as will be observed, one of these notches or recesses, $a$, is larger than the other in order that it may be applied to turn-down collars and cuffs or other articles of like-shaped edges. The opposite end of the rubber is intended for use on the inside of shirts where the neckband and bosom are joined or other and similar parts thereof, and is convex in cross-section, and instead of employing rubber or wood for the central band B any preferred material may be used, and said band is not essential to the invention.

The advantages of this article will be apparent and by its use the collars, cuffs, shirts, and similar articles just received from the laundry may be made comfortable, and the scratching, rubbing, and irritation of the skin, caused by the rough edges of such articles, especially where they are a little worn, may thus be avoided, and I reserve the right to make all such alterations in and modifications of the construction herein described as fairly come within the scope of the invention.

Having fully described my invention, I claim as new and desire to secure by Letters Patent—

A rubber for collars, cuffs, shirts and similar articles composed of suitable material, oblong in form, and having in one end U-shaped notches of different sizes and having the other end smooth and convex in cross-section substantially as shown and described.

In testimony that I claim the foregoing as my invention I have signed my name, in presence of the subscribing witnesses, this 10th day of January, 1896.

MAURICE SOLOMON LEWIN.

Witnesses:
 A. C. YHEAULON,
 HARRY ABERINER, Jr.